(12) United States Patent
Aoki et al.

(10) Patent No.: US 6,970,205 B2
(45) Date of Patent: Nov. 29, 2005

(54) DISPLAY PANEL WITH ASPECT RATIO OF MATRIX-ARRAYED PIXELS SET TO PREDETERMINED VALUE, AND DISPLAY DEVICE USING SUCH DISPLAY PANEL

(75) Inventors: Takashi Aoki, Tokyo (JP); Junichi Oshima, Kanagawa (JP); Hiroshi Murayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 595 days.

(21) Appl. No.: 10/002,755

(22) Filed: Oct. 19, 2001

(65) Prior Publication Data

US 2002/0047855 A1  Apr. 25, 2002

(30) Foreign Application Priority Data

Oct. 25, 2000 (JP) .......................... P2000-332112
Jun. 8, 2001 (JP) .......................... P2001-174022

(51) Int. Cl.$^7$ .............................................. H04N 7/01
(52) U.S. Cl. ................................................ 348/445
(58) Field of Search ........................... 348/445, 446, 348/448, 449, 441, 455–6, 458–9, 556, 790–793, 348/443; 345/3.3, 698, 1.3; 349/139, 143

(56) References Cited

U.S. PATENT DOCUMENTS

| | | | |
|---|---|---|---|
| 4,920,409 A * | 4/1990 | Yamagishi | 348/791 |
| 5,343,238 A * | 8/1994 | Takata et al. | 348/556 |
| 5,497,198 A * | 3/1996 | Kim | 348/445 |
| 5,508,714 A * | 4/1996 | Zenda | 345/3.3 |
| 5,534,934 A * | 7/1996 | Katsumata et al. | 348/445 |
| 5,625,376 A * | 4/1997 | Maekawa | 345/55 |
| 5,677,738 A * | 10/1997 | Mizutani et al. | 348/458 |
| 5,793,434 A * | 8/1998 | Lee | 348/445 |
| 5,914,754 A * | 6/1999 | Kori et al. | 348/455 |
| 6,115,072 A * | 9/2000 | Vuong et al. | 348/445 |
| 6,157,410 A * | 12/2000 | Izumi et al. | 348/445 |
| 6,226,039 B1 * | 5/2001 | Yoon | 348/445 |
| 6,229,589 B1 * | 5/2001 | Koma | 349/139 |
| 6,249,326 B1 * | 6/2001 | Hebiguchi | 349/42 |
| 6,300,977 B1 * | 10/2001 | Waechter et al. | 348/300 |
| 6,380,979 B1 * | 4/2002 | Tokoi et al. | 348/458 |
| 6,384,867 B1 * | 5/2002 | Seino et al. | 348/558 |
| 6,417,829 B1 * | 7/2002 | Jung et al. | 345/98 |
| 6,476,872 B1 * | 11/2002 | IIkawa et al. | 348/558 |
| 6,509,944 B2 * | 1/2003 | Koma et al. | 349/139 |
| 6,628,427 B1 * | 9/2003 | Aoki | 358/3.09 |
| 6,690,425 B1 * | 2/2004 | Worrell | 348/445 |
| 6,707,467 B1 * | 3/2004 | Suga | 345/698 |

* cited by examiner

Primary Examiner—Paulos M. Natnael
(74) Attorney, Agent, or Firm—Jay H. Maioli

(57) ABSTRACT

A liquid crystal display device using an LCD panel made for display of computer output, wherein video signals of a predetermined television system are converted by a decoder into field-unit picture data, and frame-unit picture data obtained therefrom by a converter are supplied to an LCD panel to display a picture composed of such video signals. The picture is displayed on an effective screen of the display panel at the original aspect ratio of the video signals of a television system by changing the width-to-height ratio of each unit pixel formed on the effective screen of the display panel, on the basis of the ratio of the number of horizontal pixels to the number of vertical pixels of the frame-unit picture data, and also on the basis of the aspect ratio of the predetermined television system.

4 Claims, 8 Drawing Sheets

NTSC

| OVERSCAN | HORIZONTAL PIXELS | VERTICAL PIXELS |
|---|---|---|
| 3% | 698 | 470 |
| 5% | 684 | 460 |
| 7% | 670 | 450 |
| 10% | 648 | 436 |

PAL

| OVERSCAN | HORIZONTAL PIXELS | VERTICAL PIXELS |
|---|---|---|
| 3% | 698 | 560 |
| 5% | 684 | 546 |
| 7% | 670 | 536 |
| 10% | 648 | 520 |

FIG. 8

| TELEVISION SYSTEM | NTSC | PAL | CCIR601 | |
|---|---|---|---|---|
| | | | NTSC | PAL |
| SAMPLING FREQUENCY | 14.31818MHz | 14.187MHz | 13.5MHz | |
| PIXELS/1H | 910 | 908 | 858 | 864 |
| EFFECTIVE PIXELS | 756 | 739 | 720 | |
| CLOCK PULSES | 133 | 148 | 123 | 133 |
| LINES/1 FRAME | 525 | 625 | 525 | 625 |
| EFFECTIVE LINES | 480 (483) | 576 | 480 | 576 |

DISPLAY PANEL WITH ASPECT RATIO OF MATRIX-ARRAYED PIXELS SET TO PREDETERMINED VALUE, AND DISPLAY DEVICE USING SUCH DISPLAY PANEL

BACKGROUND OF THE INVENTION

The present invention relates to a display panel adapted for displaying a television picture for example, and also to a display device equipped with such a display panel.

It is observed recently that liquid crystal display (LCD) devices for example are attracting remarkable attention in place of cathode ray tubes (CRT), and rapid development is now in progress with regard to television receivers and the like employing such LCD devices.

There exists a background that such LCD devices developed and used originally as monitors for computers or the like are currently in wide diffusion. In constituting an LCD device to display television pictures, it is generally customary to apply an LCD panel produced for use in a computer. Such an LCD panel is so contrived as to conform with the control standards of computer graphics display termed VGA (video graphics array).

Referring now to FIG. 9A, an explanation will be given on an example of displaying a picture on an LCD panel which is based on the VGA control standards (hereinafter referred simply to as "VGA panel") in accordance with video signal data obtained from video signals of one television system.

FIG. 9A shows an effective screen 102a of a VGA panel 102. Here, an effective screen is defined as an area where a picture can be actually displayed and viewed.

It is supposed here that the effective screen 102a of the VGA panel 102 has a resolution of 640×480 pixels. Although not shown in this diagram, the width-to-height ratio of each pixel is supposed to be 1:1. Therefore, the aspect ratio of the effective screen becomes 4:3 (= 640:480).

In displaying a television picture on such an LCD device, it is necessary, for driving the VGA panel, to convert original analog television signals into digital video signal data of a predetermined format and to display the picture on the basis of such converted digital video signal data.

Further, due to the use of an LCD panel of a monitor produced for displaying the output of a computer, it is necessary to execute conversion of interlaced television signals, which are obtained by interlaced scanning of two fields forming a single picture, into progressive television signals obtained by scanning a single picture progressively from the top thereof. For this reason, the field-unit digital video signal data inputted field by field are converted into frame-unit picture data processed frame by frame.

Such frame picture data are outputted to the VGA panel at a predetermined timing, and the VGA panel is driven by an unshown driving circuit to display the picture.

It is prescribed here that the effective pixels of the frame picture data 101 representing one frame picture are composed of 720 pixels×483 pixels.

However, in the case of displaying the picture by supplying the frame picture data 101 to the VGA panel 102 as mentioned above, there arises a problem that the displayed picture becomes a vertically contracted image which is contracted in its vertical direction.

This problem is derived from the fact that, since the number of pixels of the frame picture data 101 supplied to the VGA panel 102 is 720×483, the ratio of the number of horizontal pixels to the number of vertical pixels of the post-conversion frame picture data 101 is 4:2.68 (=720:483).

More specifically, even if the original ratio of the horizontal picture data to the vertical one inputted as NTSC television signals, i.e., the aspect ratio thereof, is 4:3, such picture data are converted into the frame picture data 101 where the ratio of the number of horizontal pixels to the number of vertical ones is 4:2.68, so that the picture is contracted in the vertical direction. Consequently, the picture displayed on the effective screen 102a is also contracted in the vertical direction.

In addition to the above, there also exists the following problem in the case of displaying the picture, which is composed of such frame picture data 101, on the effective screen 102a of the VGA panel 102.

In the television signals, normally some unrequired signal components and the like are included in the video signals of the picture edge portions. Therefore, when displaying the television picture, the video signals are overscanned in such a manner that the image of the edge portion is positioned outside the screen instead of displaying the entire picture within the screen, whereby the image of the edge portion containing some noise components is not displayed.

Regarding the overscan executed in the case of FIG. 9A, first in the horizontal direction, the frame picture data 101 is composed of 720 pixels whereas the effective screen 102a is composed of 640 pixels, so that 80 pixels are surplus in the frame picture data 101. For this reason, an overscan area OS of 40 pixels is formed in each of the left and right edge portions equally.

Meanwhile in the vertical direction, the frame picture data 101 is composed of 483 pixels whereas the effective screen 102a is composed of 480 pixels, so that 3 pixels are surplus in the frame picture data 101. For this reason, an overscan area OS of 1.5 pixels for example is formed in each of the top and bottom edge portions equally.

However, viewing the rate of the overscan quantities in the horizontal and vertical directions, the horizontal overscan quantity is approximately 11% (80 pixels), whereas the vertical overscan quantity is merely 0.6% (3 pixels), whereby a remarkable difference is existent between the horizontal and vertical overscan quantities. If the overscan quantity is insufficient, it is impossible to conceal the noise of the picture edge portion completely. Meanwhile, if the overscan quantity is excessive, the displayed picture area is rendered narrow. As long as no noise appears in the picture data, it is preferred that the widest area be displayed effectively.

But if the horizontal and vertical overscan quantities are unbalanced, in the case of FIG. 9A for example, the rate of the overscan quantities needs to be raised as a whole by increasing the vertical overscan quantity to attain a proper value. In this case, the horizontal overscan quantity, which is sufficient from the beginning, is also rendered greater to consequently cause a disadvantage that the horizontal picture range displayed on the effective screen 102a is further narrowed. If a sufficient horizontal picture range is to be ensured in this case, the vertical overscan quantity needs to be maintained small, hence inducing a possibility of failure in completely concealing the noise or distortion that appears in the top and bottom edge portions of the effective screen 102a.

Accordingly, it has been customary heretofore that, in the conventional LCD device or the like for displaying television picture, the frame picture data 101 is processed through reduction or interpolation to be thereby converted into desired frame picture data where the width-to-height ratio of the picture is proper.

FIG. 9B shows a structural example of a conversion block to execute such conversion of frame picture data. In this case, input video signals are converted into RGB data by a decoder 121 and then are supplied to a scan converter 122. Subsequently the scan converter 122 executes reduction or interpolation of the input RGB data. For example, the input RGB data are converted, through reduction of the vertical data thereof, into frame picture data of a proper width-to-height ratio and then are outputted to the VGA panel 102, whereby a desired picture having a proper aspect ratio of 4:3 is displayed on the VGA panel 102.

However, in the conventional LCD device mentioned above where a process of reduction or interpolation is executed in the scan converter 122, there is a disadvantage that the quality of the displayed picture is deteriorated, and the production cost is high since the scan converter 122 is expensive.

There is also known an LCD device of another structure, which will be described below, for balancing the vertical overscan quantity and the horizontal one.

FIG. 10A shows an exemplary case where frame picture data are displayed on an effective screen of a VGA panel in such an LCD device. In FIG. 10A, masking areas 104a and 104b are formed either electrically or mechanically in the top and bottom portions of an effective screen 102a. The horizontal and vertical overscan quantities can be rendered substantially equal to each other by adjusting the masking quantities of such masking areas 104a and 104b.

For example, the vertical overscan quantity can be substantially equalized to the horizontal overscan quantity by masking the pixel data of approximately 53 pixels (483×0.11=53). In FIG. 10A, therefore, the masking areas 104a and 104b each corresponding to 25 pixels are formed in the top and bottom portions of the effective screen 102a respectively.

FIG. 10B shows a structural example of conversion blocks to convert video signal data for realizing the picture display shown in FIG. 10A. In this case also, the input video signals are converted into RGB data in a decoder 121 and then are inputted to an IP (interlace-progressive) converter 123.

The IP converter 123 converts the input RGB data, which are received field by field, into frame picture data so as to conform the same with the display performed by the LCD panel. The frame picture data thus obtained are supplied to a mask generator 124. Then the mask generator 124 executes a predetermined masking process for the top and bottom portions of the frame picture data received from the IP converter 123, and outputs the processed data to the VGA panel 102.

As a result, the picture shown in FIG. 10A is displayed on the VGA panel 102.

However, in the VGA panel 102 of FIG. 10A, the upper and lower portions of its effective screen 102a are masked, so that the screen size is rendered smaller correspondingly thereto.

Moreover, the production cost is raised due to the necessity of newly providing the mask generator 124 in the conversion block to execute conversion of the video signal data.

Further, the image of the frame picture data 101 is left contracted in its vertical direction to consequently fail in eliminating the known disadvantage that an elliptical picture 103, which is vertically flat, is displayed in place of an exactly circular picture on the effective screen 102a.

SUMMARY OF THE INVENTION

It is therefore an object of the present invention to provide improvements where a proper width-to-height ratio of pixels can be set through solution of the problems mentioned above.

According to one aspect of the present invention, there is provided a display panel where a display screen is formed with matrix-arrayed pixels driven to display a picture. In this display panel, the width-to-height ratio of the pixels is set in accordance with a corrective value for achieving a required width-to-height ratio with regard to the picture displayed on the screen, on the basis of the ratio of the number of effective horizontal pixels to the number of effective vertical pixels of the frame picture data obtained by converting the video signals of a predetermined television system into digital video signals in conformity with predetermined standards, and also on the basis of the aspect ratio prescribed by the above television system.

According to another aspect of the present invention, there is provided a display device equipped with a display panel where a display screen is formed with matrix-arrayed pixels driven to display a picture. In this display device, the display panel is so contrived that the width-to-height ratio of the pixels is set in accordance with a corrective value acquired on the basis of the ratio of the number of effective horizontal pixels to the number of effective vertical pixels of the frame picture data obtained by converting the video signals of a predetermined television system into digital video signals in conformity with predetermined standards, and also on the basis of the aspect ratio prescribed by the above television system.

In each of such structures, the display panel is so contrived as to set the width-to-height ratio of the pixels in accordance with a corrective value which is acquired on the basis of the ratio of the number of effective horizontal pixels to the number of effective vertical pixels of the frame picture data obtained by converting the video signals of a predetermined television system into digital video signals in conformity with predetermined standards, and also on the basis of the aspect ratio prescribed by the above television system.

More specifically, in the present invention, a desired aspect ratio adapted for each use and the like can be achieved with ease by changeably setting the width-to-height ratio of the pixels with regard to the picture to be displayed on the screen, and a proper picture of the original aspect ratio conforming with the relevant television system can be displayed on the screen. Further, it becomes possible to eliminate the necessity of any signal processing circuit such as a scan converter required heretofore to change the aspect ratio in displaying a television picture in the conventional display device, hence causing no deterioration of the displayed picture quality.

In addition, since the numbers of pixels are determined in accordance with the overscan quantities, the horizontal and vertical overscan quantities can be well balanced with facility.

The above and other features and advantages of the present invention will become apparent from the following description which will be given with reference to the illustrative accompanying drawings.

BRIEF DESCRIPTION OF THE DRAWINGS

FIG. 8 shows a table of items in converting television signals of various television systems into digital signals;

DETAILED DESCRIPTION OF THE PREFERRED EMBODIMENTS

Figure 1:
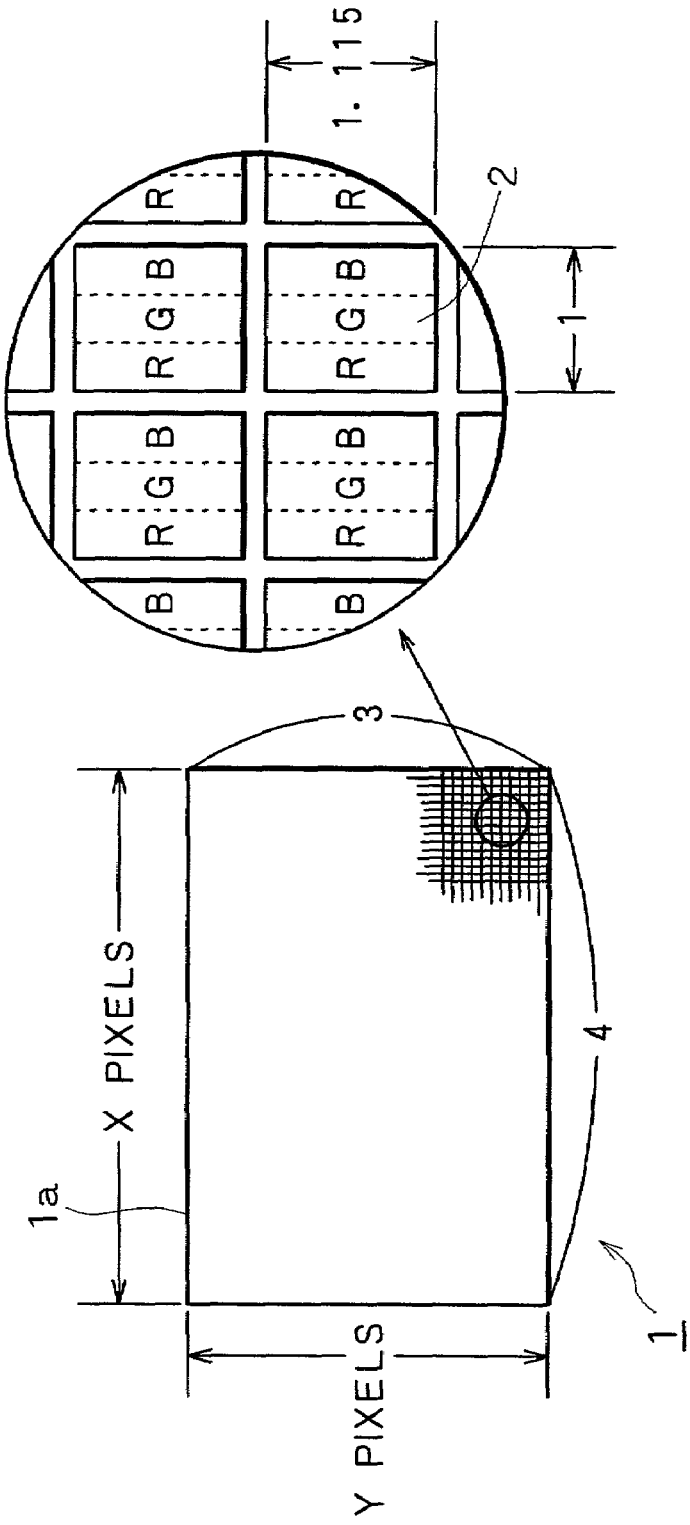
FIGS. 1A and 1B show a structural example of a display panel representing a first embodiment of the present invention.

Hereinafter a display panel of the present invention and a display device using such a panel will be described in detail with reference to some preferred embodiments thereof. It is supposed here that the display device of any embodiment is not on the premise of displaying a picture of a computer for example, but is one specialized for displaying a television picture.

It is also supposed here that the display device of any embodiment is equipped with a liquid crystal display (LCD) panel, whose structure, driving mode and the like may be conventional ones known heretofore.

Prior to describing the LCD device of the first embodiment, an explanation will be given, with reference to FIG. 8, on conversion formats employed for converting video signals of various television systems into digital signals. In FIG. 8, any numerical value other than the sampling frequency, the number of scanning lines and the number of effective lines denotes the number of clock pulses.

First, in the case of converting analog video signals into digital video data by the conventional NTSC system, the signals are sampled according to sampling clock pulses of 14.31818 MHz, so that one pixel is obtained per sampling clock pulse. Therefore, 910 pixel data are obtained according to 910 sampling clock pulses during 1 line corresponding to one horizontal scanning interval. Further 756 effective pixels are obtained out of such 1-line pixel data.

In the NTSC system, the number of scanning lines per frame, i.e., the number of lines, is 525, but the number of effective lines after such digitization is 480. Practically, however, there may be a case of 483 effective lines due to the relationship to HDTV (high definition television). The effective lines described here are different from those in analog form.

Meanwhile in the conventional PAL system, signals are sampled according to sampling clock pulses of 14.187 MHz, and similarly one pixel is obtained per sampling clock pulse. Therefore, 908 pixel data are obtained per line according to 908 sampling clock pulses. Further 739 effective pixels are obtained out of such 1-line pixel data.

Also in the PAL system employing 625 lines per frame, the number of effective lines after digitization is 576.

Since the format of the SECAM system conforms with that of the PAL system, a repeated explanation thereof is omitted here.

Thus, the sampling frequency and the like are different in the NTSC system and the PAL system as mentioned, so that it has been highly demanded heretofore to realize sampling at a common sampling frequency in both the NTSC and PAL systems.

Recently, there has been prescribed, by the International Radio Consultative Committee (CCIR), a novel CCIR601 format based on digital studio standards, wherein video signals of both the NTSC and PAL systems are sampled at a common sampling frequency and then are converted into digital form.

According to this CCIR601 format based on digital studio standards, the sampling frequency is 13.5 MHz in each of the NTSC and PAL systems.

In this case, the number of pixels per line is 858 in the NTSC system or 864 in the PAL system, wherein the number of effective pixels is 720 which is set common to both systems.

Meanwhile, the number of lines per frame is 525 in the NTSC system or 625 in the PAL system, and the number of effective lines after digitization is 480 in the NTSC system or 576 in the PAL system.

Consequently, the frame picture data of the NTSC system digitized in conformity with the CCIR601 format is composed of 720×483 pixels. The frame picture data of the PAL system digitized similarly is composed of 720×576 pixels.

On the ground of the digital conversion format described above, an explanation will now be given on the LCD device of the present invention as a preferred embodiment thereof for displaying a television picture.

The explanation of this embodiment connotes an exemplary display panel for displaying a picture based on the video signal data of one system (hereinafter referred to as CCIR601-NTSC system) that digitizes the NTSC video signals according to the CCIR601 format, and also another exemplary display panel for displaying a picture based on the video signal data of another system (hereinafter referred to as CCIR601-PAL system) that digitizes the PAL video signals according to the CCIR601 format.

Referring first to FIGS. 1A and 1B, an explanation will be given on the display panel for displaying a picture of CCIR601-NTSC video signals. FIG. 1A shows an effective screen 1a where a picture is actually displayed in the display panel 1.

As shown in an enlarged view of FIG. 1B, the effective screen 1a is composed of pixels 2 arrayed to form a matrix. The display panel 1 in this case has R (red), G (green) and B (blue) light emitting regions in each unit pixel 2 so as to be capable of displaying a color picture.

In this embodiment, the number of pixels in the effective screen 1a is determined by the number of effective pixels of the frame picture data based on the CCIR601 format and also by the set overscan quantity. A detailed description will be given later on the concrete number of pixels in the effective screen 1a.

As mentioned in connection with the conventional example of the related art, the width-to-height ratio of each pixel in the known VGA panel is 1:1. In this embodiment, however, the width-to-height ratio of each pixel 2 is 1:1.115 as shown in FIG. 1B. The reason for setting such width-to-height ratio in this embodiment will now be described below.

The LCD device of this embodiment is so structured as to display video signal data of the CCIR601-NTSC system, as mentioned above.

The NTSC frame picture data converted according to the CCIR601-NTSC system are composed of 720×483 pixels, and therefore the width-to-height ratio (horizontal to vertical) is approximately 4:2.68.

If the CCIR601-NTSC frame picture is displayed on the VGA panel where the width-to-height ratio of each pixel is 1:1 as in the prior art, naturally the displayed picture is contracted in its vertical direction.

Therefore, in order to display a proper picture on the effective screen 1a of the display panel 1 by eliminating such vertical contraction of the displayed picture, a correction is performed in such a manner that the frame picture having a width-to-height ratio of 4:2.68 becomes a picture having the original NTSC aspect ratio of 4:3.

For this reason, in the display panel 1 of this embodiment, the conventional width-to-height ratio 1:1 of each effective pixel is so changed that the aspect ratio of the picture displayed on the effective screen 1a is corrected to 4:3.

Here, the width-to-height ratio of the frame picture data is expressed as a:b, where a denotes the number of effective pixels in the horizontal direction (width) of the frame picture data, and b denotes the number of effective lines in the vertical direction (height) of the frame picture data. The aspect ratio of the original picture to be displayed is expressed as c (width) :d (height). In this case, the desired aspect can be obtained by changing the width-to-height ratio a:b of the picture to c:d. A correction may be performed in such a manner as to eliminate the difference between the values b and d in the case of a=c, i.e., to equalize the values in the vertical direction. A corrective value CRCT required for this purpose is such that the following equation is satisfied.

$$a:(b \times CRCT)=c:d \quad (1)$$

Therefore, the corrective value CRCT can be calculated as $$CRCT=(a \times d)/(b \times c) \quad (2)$$

The total number of effective pixels in the CCIR601-NTSC frame picture data is 720×483, and the aspect ratio of the NTSC picture is 4:3, so that the corrective value is obtained from Eq. 2 as $$CRCT=(720 \times 3)/(483 \times 4)=1.115$$

This signifies that, with regard to the width-to-height ratio of each pixel 2 shown in FIG. 1B, the height may be set to 1.115 in comparison with the width of 1 as a reference. That is, the corrective value regarding the width-to-height ratio of each pixel may be set to 1 (width):1.115 (height), and this ratio is coincident with the width-to-height ratio of each pixel 2 in this embodiment shown in FIG. 1B.

If each pixel 2 is corrected to such a size, the image picture obtained by displaying the frame picture data of a width-to-height ratio 4:2.68 is enlarged 1.115 times only in its vertical direction to consequently change the aspect ratio of the image picture displayed on the effective screen 1a to 4:3 as a whole. As a result, a proper picture can be displayed without any contraction on the display panel 1.

In most cases, it is normal that television signals contain some unrequired signal components and the like in the video signal portions thereof corresponding to edges of the picture, and such unrequired signal components appear as noise or distortion for example. Therefore, the video signal data obtained by conversion from the television signals also contain the noise components in the data portions corresponding to the edges of the frame picture.

For this reason, it is necessary, in the display panel 1 of this embodiment also, to execute overscan so that the noise and the like contained in the edges of the frame picture data may not appear on the effective screen 1a.

Further, as mentioned in connection with the known problems existing in the related art, it is preferred that the vertical and horizontal overscan quantities be well balanced so as to ensure the possibly widest display area without displaying any noise or the like.

Now an explanation will be given on the actual overscan quantities to be set.

In this embodiment, the experimental result achieved signifies that, on the basis of the relationship between the actual frame picture data 3 and the effective screen 1a for example, satisfactory display of a picture without any practical problem can be realized by obtaining an overscan quantity of approximately 5% in total in the vertical and horizontal directions with respect to the frame picture data 3.

Figure 2:
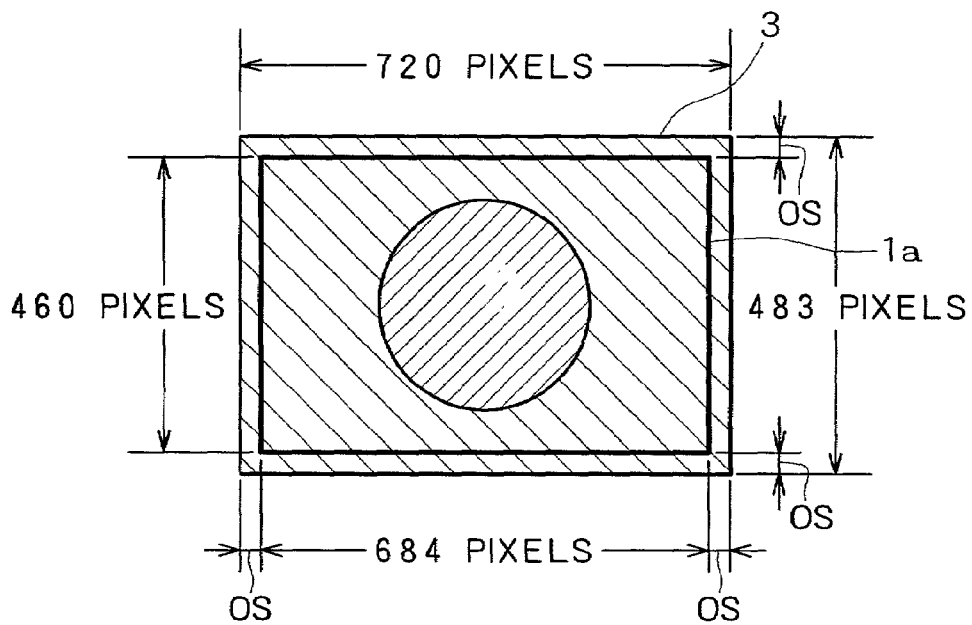
FIG. 2 shows an example of displaying a picture on the display panel of FIG. 1A.

An overscan area OS of approximately 2.5% is allocated to each of the left and right edges equally in the vertical direction, as shown in FIG. 2. Similarly, an overscan area OS of approximately 2.5% is allocated to each of the top and bottom edges equally in the horizontal direction.

The number of pixels occupying the effective screen 1a of the display panel 1 is finally determined by the overscan quantity thus set.

For example, in case the overscan quantity is set to 5% as described above, the number of horizontal pixels and that of vertical pixels in the effective screen 1a may be 95% of the number of horizontal pixels and that of vertical pixels of the frame picture data 3, respectively. Therefore, as shown in FIG. 2, the number of horizontal pixels in the effective screen 1a may be 684 pixels equivalent to 95% of 720 effective pixels of the CCIR601-NTSC frame picture data 3. Similarly, the number of vertical pixels in the effective screen 1a may be 459 pixels equivalent to 95% of 483 effective pixels of the frame picture data 3. Although the explanation of FIG. 8 represents an exemplary case of 480 vertical pixels in the CCIR601-NTSC system, there may be another case of 483 vertical pixels as shown in FIG. 2. For example, in the case of conforming with HDTV also, there may be 483 pixels.

As obvious from the above description, the display panel 1 of this embodiment is so contrived as to change the width-to-height ratio of each unit pixel 2 by the corrective value calculated as mentioned on the basis of the width-to-height ratio of the picture data and also the aspect ratio 4:3 prescribed in the NTSC system. Consequently, despite input and display of any picture where the width-to-height ratio of the effective pixels thereof is not 4:3 such as frame picture data of the CCIR601-NTSC system, it is still possible to realize display of a proper picture without any image contraction on the effective screen 1a.

In this embodiment, it is also possible to easily determine the number of pixels in the effective screen 1a in accordance with the overscan quantity, whereby the horizontal and vertical overscan quantities can be well balanced as shown in FIG. 2.

Next, a second embodiment of the present invention will be described with reference to FIGS. 3A and 3B. This second embodiment represents a display panel corresponding to PAL frame picture data digitized in conformity with the CCIR601 format.

Figures 3A, 3B:
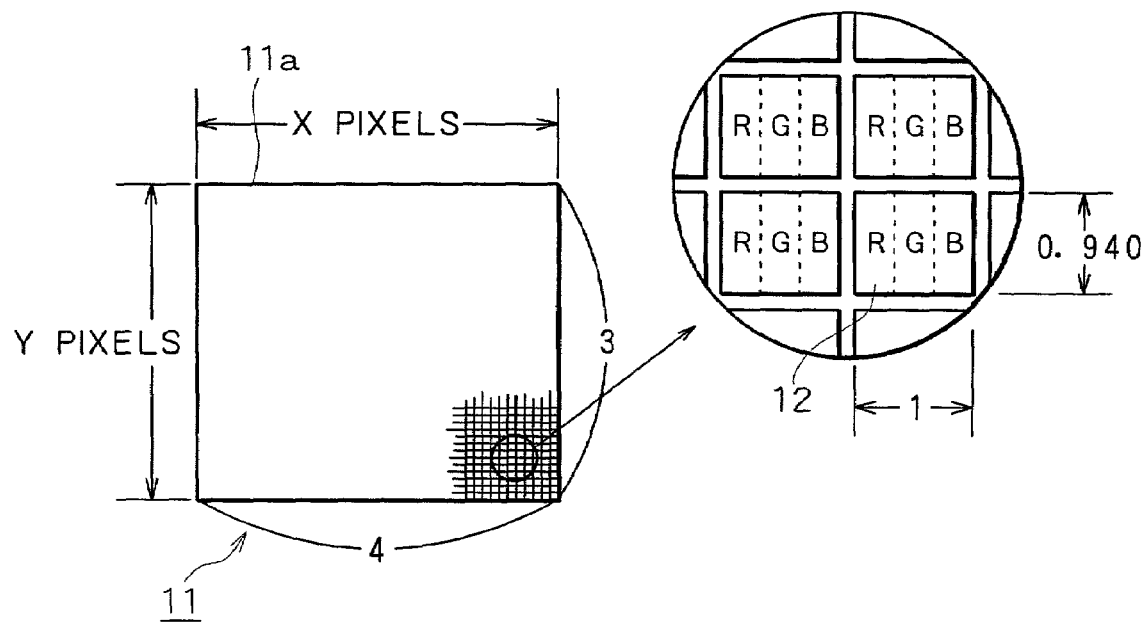
FIGS. 3A and 3B show a structural example of a display panel representing a second embodiment of the present invention.

In an effective screen 11a of a display panel 11 shown in FIG. 3A, there are arrayed stationary pixels composed of X pixels×Y pixels. The respective numbers of such pixels in this effective screen 11a are determined by overscan quantities of the frame picture data, as will be described later. The concrete numbers of unit pixels in the effective screen 11a will also be described later.

The unit pixels 12 shown in an enlarged view of FIG. 3B are arrayed to form a matrix in the same manner as the aforementioned unit pixels 2 shown in FIG. 1B.

As explained with reference to FIG. 8, the frame picture data 13 of each CCIR601-PAL frame are composed of 720×576 pixels.

In this case, therefore, picture signals originally having an aspect ratio of 4:3 are converted into frame picture data of 4:3.2 (720:576), whereby the picture of the frame data 13 is expanded in its vertical direction.

Consequently, in order to display a proper picture on the effective screen 11a of the display panel 11, a corrective value is calculated for changing the width-to-height ratio 4:3.2 of the picture of such frame data 13 to the aspect ratio 4.3 of the actual input picture.

The corrective value CRCT required in this case is calculated as follows.

The number of effective pixels in the CCIR601-PAL frame picture data is 720×576, and the aspect ratio of the PAL picture is 4:3. Accordingly, the corrective value is obtained from Eq. 2 as in the first embodiment.

$$CRCT=(720\times3)/(576\times4)=0.940$$

This signifies that, with regard to the width-to-height ratio of each pixel 12 in the second embodiment corresponding to the PAL system, the height may be set to 0.940 in comparison with the width of 1 as a reference, as shown in FIG. 3B.

Thus, in the case of conforming with the CCIR601-PAL system, the aspect ratio of the picture displayed on the effective screen 11a can be corrected to 4:3 by setting the width-to-height ratio of each unit pixel 12 in the display panel 11 to 1 (width): 0.940 (height).

Figure 4:
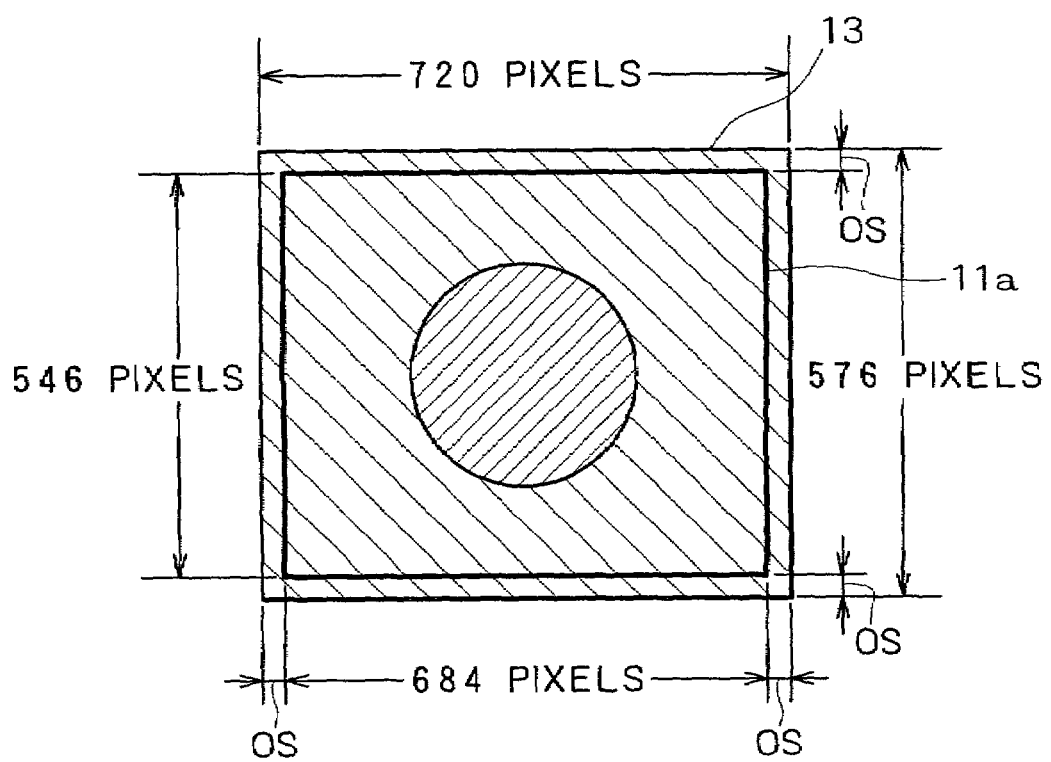
FIG. 4 shows an example of displaying a picture on the display panel of FIG. 3A.

In this case also, when the overscan quantity is set to 5% of the frame picture data as shown in FIG. 4, the number of horizontal pixels on the effective screen 11a is 684 pixels equivalent to 95% of the 720 effective pixels of the frame picture data 13, as shown in FIG. 4.

The number of vertical pixels on the effective screen 11a is 548 pixels equivalent to 95% of the 576 effective lines.

The display panel 1 (11) of each embodiment described above is concerned with an exemplary case where the overscan quantity in displaying the picture on the effective screen 1a (11a) is set approximately to 5% of the frame picture data 3 (13). However, the actual overscan quantity may be changed to any other adequate value in conformity with the specification and the like of the display panel 1 (11).

It is a matter of course that, for example, the overscan quantity can be set to a smaller value for widening the picture range to be displayed on the effective screen 1a, or the overscan quantity can be set to a greater value when enlarging the picture to be displayed on the effective screen 1a.

Figures 5A, 5B, 6:
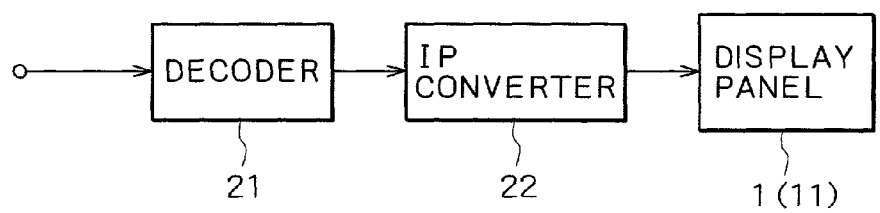
FIGS. 5A and 5B show the relationship between overscan quantities and the numbers of pixels forming an effective screen of the display panel in the second embodiment.
FIG. 6 shows a structural example of a data conversion block provided in the display device of the embodiment.

FIGS. 5A and 5B show the relationship between the overscan quantities and the numbers of pixels of the effective screen in the display panel of each embodiment. In FIG. 5A, there is shown an example of the relationship between the overscan quantities and the numbers of pixels of the effective screen 1a in the display panel 1 corresponding to the NTSC system shown in FIG. 2.

In the display panel 1, the overscan quantity is set to 5% of the frame picture data with 684 horizontal pixels equivalent approximately to 95% of the 720 effective pixels of the frame picture data 3, and with 460 vertical pixels equivalent approximately to 95% of the 480 effective lines of the frame picture data 3.

Similarly, as shown in FIG. 5A, the overscan quantity is set to 3% of the frame picture data with 698 horizontal pixels and 470 vertical pixels.

Further, the overscan quantity is set to 7% with 670 horizontal pixels and 450 vertical pixels. The overscan quantity is set to 10% with 648 horizontal pixels and 436 vertical pixels.

In FIG. 5B, there is shown an example of the relationship between the overscan quantities and the numbers of pixels of the effective screen 11a in the display panel 11 corresponding to the PAL system shown in FIG. 4.

In this case, the overscan quantity is set to 3% of the frame picture data with 698 horizontal pixels and 560 vertical pixels. The overscan quantity is set to 7% of the frame picture data with 670 horizontal pixels and 536 vertical pixels. The overscan quantity is set to 10% with 648 horizontal pixels and 520 vertical pixels.

If the overscan quantity is changed in such display device, the number of pixels of the effective screen is also changed in proportion thereto. Accordingly, when the overscan quantity is increased for example, the number of pixels of the effective screen is diminished to consequently reduce the size of the effective screen. In this case, therefore, the size of the effective screen can be altered to the former size by enlarging the shape of the entire unit pixels formed on the effective screen.

It may be needless to say that, since the width-to-height ratio of each unit pixel 2 is not affected directly by any change of the overscan quantity, the aforementioned width-to-height ratio of each unit pixel 2 is kept unchanged.

FIG. 6 schematically shows a structural example of the data conversion block furnished in the display device of this embodiment. In this case, input NTSC or PAL video signals are converted by a decoder 21 into RGB data and then are supplied to an IP converter 22.

The IP converter 22 converts the RGB data, which are inputted field by field, into picture data of each frame in conformity with the CCIR601 format mentioned above, and then outputs the frame picture data to the display panel 1 (11) at a predetermined timing. Subsequently the display panel 1 (11) is driven by an unshown driving circuit so that the picture is displayed on the effective screen 1a (11b) as described.

Figure 9A:
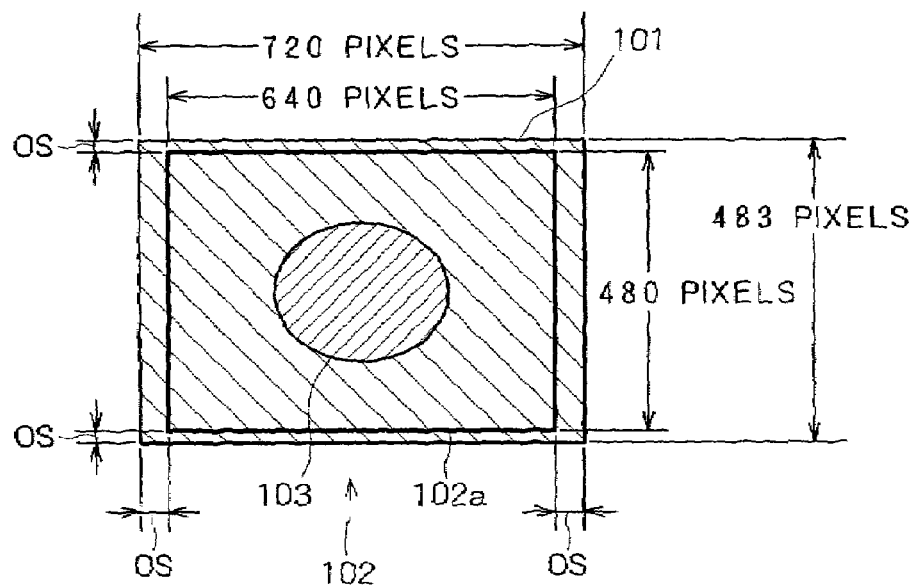
FIGS. 9A and 9B are diagrams for explaining a conventional display panel.
Figure 9B:
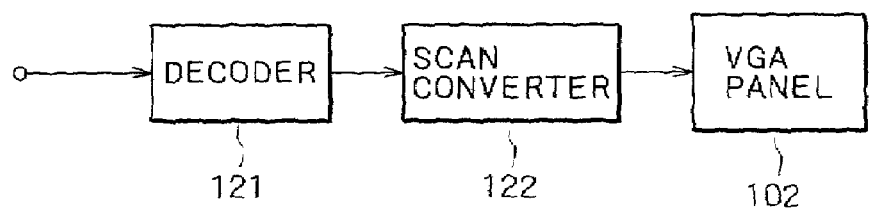
Figure 10A:
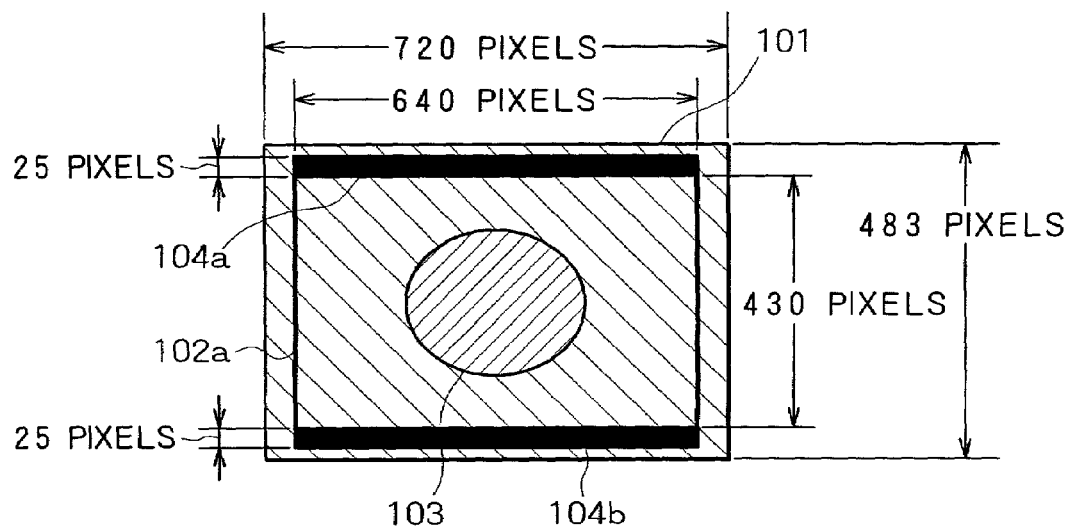
FIGS. 10A and 10B are diagrams for explaining another conventional display panel.
Figure 10B:
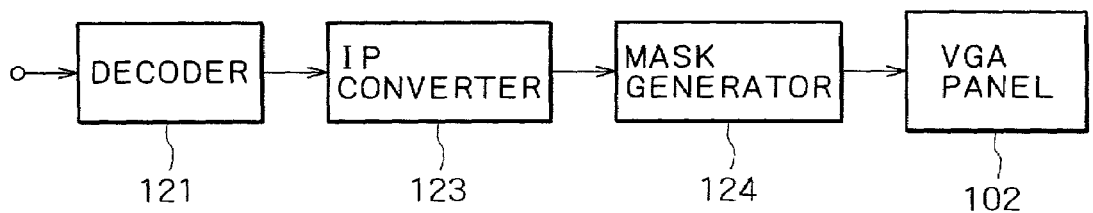

As obvious from a comparison of the block structure of FIG. 6 with the aforementioned block structures of FIGS. 9B and 10B related to the prior art, a proper picture is displayed, in the LCD device of this embodiment, on its effective screen by changing the width-to-height ratio of each unit pixel on the effective screen of the display panel, hence eliminating the necessity of a scan converter, a mask generator and the like required heretofore in the known LCD device.

Consequently, it becomes possible to simplify the data conversion block furnished in the LCD device, thereby achieving a decrease of the circuit scale and curtailment of the production cost.

Further, due to the non-necessity of reducing the video signal data by a scan converter, the image quality of the displayed picture is not deteriorated either.

Moreover, the display panel of this embodiment can be manufactured in accordance with the known VGA panel production process merely by altering the shape of a mask used to form pixels of a predetermined width-to-height ratio. Therefore, another advantage is attainable in the point that the production cost of the display panel of this embodiment is suppressed to be substantially equal to that of the conventional VGA panel.

In the display panel of this embodiment mentioned above, the aspect ratio of the displayed picture is corrected by changing the width-to-ratio of each pixel itself while fixing the interval between mutually adjacent pixels formed physically on the display panel. However, the aspect ratio of the displayed picture can also be corrected by a modified structure which will be described below.

Figure 7A:
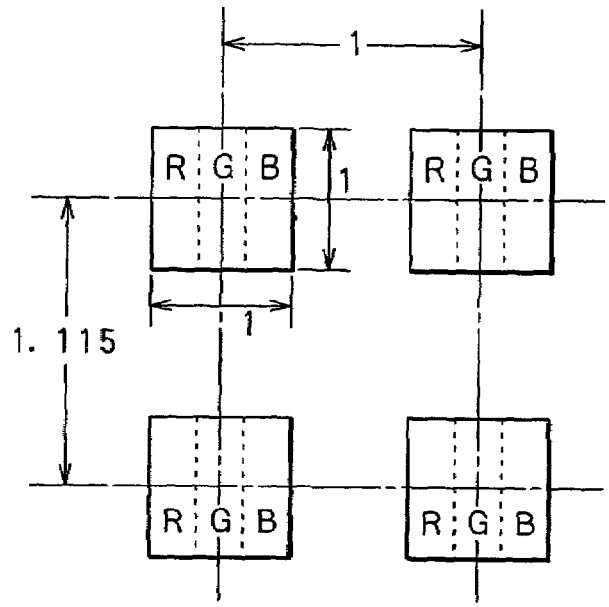
FIGS. 7A and 7B are diagrams for explaining the structures of other display panels.
Figure 7B:
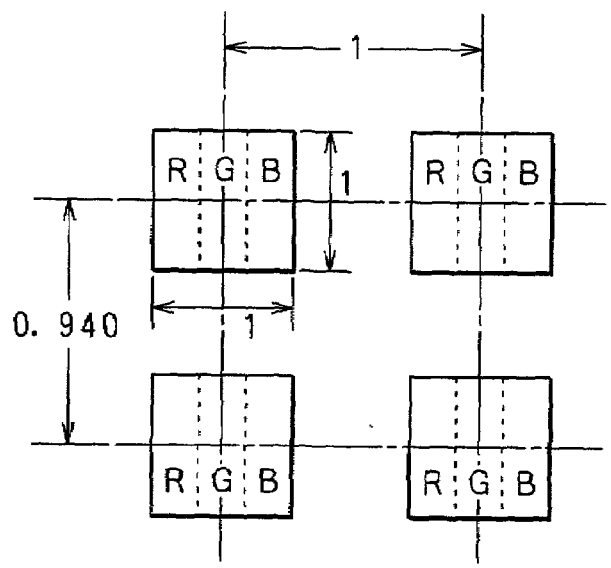

FIGS. 7A and 7B show an enlarged view of pixels arrayed to form a matrix on the display panel. In one case of conforming with the CCIR601-NTSC system for example, the width-to-height ratio of each pixel 2 is set to 1:1 as in the conventional VGA panel shown in the diagram, wherein the distance between horizontally adjacent pixels and the distance between vertically adjacent pixels are set to a ratio of 1:1.115.

In this case, a block area consisting of an aggregation of four pixels, where two pixels are existent in each of horizontal and vertical directions, is regarded as one pixel instead of each pixel 2 serving as a minimum unit, and the width-to-height ratio of such a block area of the pixels is changed.

Meanwhile, in another case of conforming with the CCIR601-PAL system, the width-to-height ratio of each pixel 2 is set also to 1:1 as shown in FIG. 7B, and the distance between horizontally adjacent pixels and the distance between vertically adjacent pixels are set to a ratio of 1:0.940.

In the present invention, there may be contrived an arrangement where the technique employed in the first and second embodiment for changing the width-to-height ratio of each pixel 2 (12) is combined with the technique in the modifications of FIGS. 7A and 7B for changing the ratio of distances between mutually adjacent pixels, so as to attain the same result as that obtained by setting the width-to-height ratio of the pixels to 1:1.115 in the case of conforming with the CCIR601-NTSC system.

As an application of the modifications shown in FIGS. 7A and 7B, there may also be contrived an arrangement where a block area consisting of an aggregation of four pixels, in which two pixels are existent in each of horizontal and vertical directions, is regarded as one pixel, and the ratio of the horizontal distance to the vertical distance between such block areas is changed to obtain a width-to-height ratio of 1:1.115 with regard to the pixels of the CCIR601-NTSC system Although each of the embodiments mentioned above is concerned with an LCD device, it is merely an example, and the display panel and the display device of the present invention are applicable to, e.g., an LED display device using light emitting diodes as pixels or a display device using a fluorescent display tube or the like on condition that individual pixels are arrayed to form a matrix.

Further, the above embodiments have been explained with reference to exemplary display panels that conform with frame picture data obtained by digitizing video signals of the NTSC system and the PAL system respectively into the CCIR601 format. However, it is to be understood that the present invention is not limited to such examples alone, and it may be applied to a display panel corresponding to frame picture data obtained by converting, e.g., picture data of the SECAM system into the CCIR601 format. Moreover, the present invention is applicable also to any video signal data obtained by digitizing the video signals into some other conversion format than the CCIR601 format.

What is claimed is:

1. A display panel comprising a display screen formed with matrix-arrayed pixels driven for displaying a picture, wherein while a width and height ratio of each pixel itself is set to 1:1, a width-to-height ratio of said picture is set by changing a ratio of a horizontal distance between adjacent pixels to a vertical distance therebetween in accordance with a corrective value for achieving a required width-to-height ratio with regard to the picture displayed on said display screen based on a ratio of the number of effective horizontal pixels to a number of effective vertical pixels of frame-unit picture data of a predetermined television system standard and also based on an aspect ratio prescribed by said predetermined television system standard.

2. The display panel according to claim 1, wherein said predetermined television system standard is one of an NTSC, PAL and SECAM system standard.

3. A display device having a display panel with a display screen formed with matrix-arrayed pixels driven for displaying a picture, said display device comprising:
    a decoder for converting video signals of a predetermined television system standard into field-unit picture data; and
    a converter for converting the field-unit picture data from said decoder into frame-unit picture data,
    wherein said display panel is structured so that while a width and height ratio of each pixel itself is set to 1:1, a width-to-height ratio of said picture is set by changing a ratio of the horizontal distance between adjacent pixels to a vertical distance therebetween in accordance with a corrective value calculated based on a ratio of a number of effective horizontal pixels to a number of effective vertical pixels of the frame-unit picture data obtained from said converter and based on an aspect ratio prescribed by said predetermined television system.

4. The display device according to claim 3, wherein said predetermined television system standard is one of an NTSC, PAL and SECAM system standard.

* * * * *